United States Patent [19]

Thomas et al.

[11] Patent Number: 4,968,563
[45] Date of Patent: Nov. 6, 1990

[54] LIGHT TRANSMITTING GLAZING PANE

[75] Inventors: Jean-François Thomas, Ottignies; Jean Roucour, Montignies-le-Tilleul; Robert Terneu, Thiméon, all of Belgium

[73] Assignee: Glaverbel, Brussels, Belgium

[21] Appl. No.: 429,464

[22] Filed: Oct. 23, 1989

Related U.S. Application Data

[63] Continuation of Ser. No. 109,274, Oct. 16, 1987, abandoned.

[30] Foreign Application Priority Data

Oct. 16, 1986 [GB] United Kingdom ............... 8624826

[51] Int. Cl.$^5$ .............................................. E06B 3/24
[52] U.S. Cl. .................................. 428/432; 350/1.6; 350/166; 428/212; 428/220; 428/332; 428/336; 428/426; 428/702
[58] Field of Search ............... 428/432, 426, 332, 336, 428/213, 220, 702; 350/1.6, 166

[56] References Cited

U.S. PATENT DOCUMENTS

| | | | |
|---|---|---|---|
| 3,885,855 | 5/1975 | Gross | 360/1.6 |
| 4,065,600 | 12/1977 | King et al. | 428/432 |
| 4,146,657 | 3/1979 | Gordon | 428/432 |
| 4,377,613 | 3/1983 | Gordon | 428/432 |
| 4,600,654 | 7/1986 | Lindner | 428/432 |
| 4,640,867 | 2/1987 | Oyama et al. | 428/432 |
| 4,687,687 | 8/1987 | Terneu et al. | 428/432 X |
| 4,687,707 | 8/1987 | Matsuo et al. | 428/432 X |
| 4,743,506 | 5/1988 | Russo et al. | 428/432 X |

FOREIGN PATENT DOCUMENTS

| | | |
|---|---|---|
| 0989555 | 9/1965 | United Kingdom . |
| 2136316 | 9/1984 | United Kingdom . |
| 2174412 | 11/1986 | United Kingdom . |

OTHER PUBLICATIONS

Chemical Abstracts, v. 103, No. 16, Oct. 1985, p. 282, Resume No. 127950k, JP-A-60-81-047, Toyota Motor Co. Ltd., "Electromagnetic Wave-Shielding Window Glass".

Primary Examiner—Ellis P. Robinson
Assistant Examiner—Arlhene A. Turner
Attorney, Agent, or Firm—Spencer & Frank

[57] ABSTRACT

A light transmitting glazing pane includes a first coating on an exposed face of a glass sheet which reduces the emissivity of that face in respect of infra-red radiation having wavelengths in excess of 3 μm, and on the or another face of the pane a solar radiation screening coating which is adapted to screen short wavelength infra-red radiation, the thickness of each coating being selected so that the pane has a visible light transmissivity of at least 70% and a total solar radiant energy transmissivity of at most 75%. Such panes are useful for limiting solar energy gain while allowing good through visibility, and they may therefore be used to form vehicle windows.

23 Claims, 1 Drawing Sheet

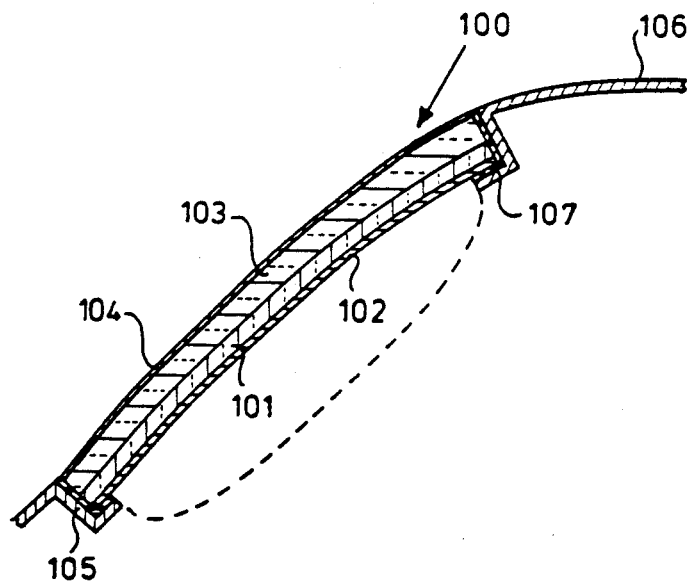

4,968,563

LIGHT TRANSMITTING GLAZING PANE

BACKGROUND OF THE INVENTION

1. Field of the Invention

This application is a combination of Ser. No. 07/109,274, filed 10-16-87, now abandoned.

This invention relates to a light transmitting glazing pane comprising at least one sheet of coated glass. This invention has particular, but not exclusive, reference to glazing panels intended for installation as vehicle windows, for example windows of trains, ships or aircraft, and especially windows of road vehicles. Although the invention is applicable to coated glazing panels generally, the particular problem to be solved by this invention is especially noteworthy in the case of road vehicles, and accordingly the following description of the invention and its advantages will lie mainly in that context.

2. Description of the Related Art

It is well known that if a vehicle is left in an unshaded position during a warm sunny day, the interior of the vehicle can soon become uncomfortably or even dangerously hot. There are indeed cases on record where animals left in parked motor cars have died from heatstroke, even in countries with temperate climates. It is desirable therefore to limit the solar energy gain of a vehicle in order to reduce such overheating. A principal source of this solar energy gain takes place through the vehicle windows.

It is well known to provide solar screening panels for buildings, and in fact this is an increasing feature of modern architectural practice. But known glazing panels of that kind are always intended to serve a second purpose, namely to screen off a high proportion of visible radiation in order to cut down glare within the building. For example, double glazing panels are known which have a visible light transmittance of 49% and a total solar radiant heat transmittance of 42%. Such panels are not suitable for many purposes where a high visible light transmissivity is required, as is the case in particular with road vehicle windscreens. It is a legal requirement in some countries that the visible light transmissivity of a road vehicle windscreen should be at least 70%.

SUMMARY OF THE INVENTION

It is an object of the present invention to provide a glazing pane which could, if suitably sized and shaped, be used as a vehicle window, and which presents favourable properties as regards a good visible light transmissivity and a low total solar energy transmissivity.

According to the present invention, there is provided a light transmitting glazing pane comprising at least one sheet of coated glass, characterised in that such pane comprises a first coating on an exposed glass face thereof which reduces the emissivity of that face in respect of infra-red radiation having wavelengths in excess of 3 $\mu$m, and on the or another face of the pane a solar radiation screening coating which is adapted to screen short wavelength infra-red radiation, the thickness of each coating being selected so that the pane has a visible light transmissivity of at least 70% and a total solar radiant energy transmissivity of at most 75%.

It will be appreciated that the effectiveness of the pane will in some measure depend upon the side thereof on which energy is incident. For the best results, the low emissivity coating should be inboard of the solar screening coating, so that of those two coatings, the solar screening coating is first to intercept solar radiation. In this way, any energy absorbed by the pane, and especially by the solar screening coating, due to incident radiation which tends to heat the pane, will be preferentially re-radiated towards the outside due to the presence of the low emissivity coating. In the remainder of this description, unless the context requires otherwise, it will be assumed that the low emissivity coating faces away from the radiation source.

Such a glazing pane has high visible light transmissivity, and good solar energy screening properties, and being a pane, it can be made to a suitable size and shape for incorporation into a vehicle for use as a window thereof, for example a front or rear windscreen, a side window or a roof light, whether openable or not.

Advantageously, the pane has a visible light transmissivity of at least 75%, so as to allow better visibility therethrough. Such a pane may, for example, be constituted as a vehicle window such as a windscreen for use even in countries whose regulations require very high visible light transmission through vehicle windows.

Also in order to promote visibility through the pane, it is particularly preferred that the pane has a visible light absorbency of not more than 3%.

In preferred embodiments of the invention, such low emissivity coating is a tin oxide coating. Tin oxide coatings can be very effective in reducing the emissivity of the coated sheet face while at the same time having a good abrasion resistance and resistance to attack by the atmosphere, so not detracting from a long useful life for the coated pane.

Advantageously, such low emissivity coating is a fluorine-doped tin oxide coating. We have found that such coatings can be a highly effective compromise between achieving a good low emissivity for infra-red radiation while still allowing good visible light transmission.

Preferably, such low emissivity coating has a thickness in the range 350nm to 150nm. For a given coating composition, thicknesses within such a range have been found to present the most favourable compromise between on the one hand low infra-red emissivity and good abrasion resistance which are both promoted by increase in the coating thickness, and on the other hand a high visible light transmissivity. The extent to which light is absorbed in a coating of given composition will increase with the thickness of the coating, but it is also necessary to take account of the interference effect of light which is reflected at the faces of the coating. For maximum transmissivity of light of a given wavelength, the thickness of the coating multiplied by the refractive index of the coated material should be equal to one half of that wavelength.

Coatings having a said thickness in the range 350nm to 150nm have a further advantage in that there is a rather low tendency for them to present disagreeable coloration in reflection due to interference effects. It is especially preferred that the coated pane has a colour purity of not more than 10% and preferably not more than 6%, so that it presents a neutral aspect. This is a very important consideration for panes for use as vehicles glazings. It helps to avoid distractions to the driver and any risk that the driver might mistake the colour of a traffic control sign or signal.

In order to promote low solar energy transmissivity, it is preferred that such low emissivity coating imparts to the coated face an emissivity factor in respect of infra-red radiation having wavelengths in excess of 3 μm of at most 0.50, and preferably of less than 0.35.

The aims of the invention are especially promoted by highly efficient low emissivity coatings. It is desirable that such coatings should have a good low emissivity, but also that they should be sufficiently thin as not to reduce visible light transmission by too great an extent. We have found that these aims are promoted when, as is preferred, such low emissivity coating has an emissivity factor and a thickness (when expressed in nanometers) which are such that their product is not more than 110, and is preferably not more than 90.

In some preferred embodiments of the invention, said pane is constituted as a laminate in which a said glass sheet is bonded to at least one other sheet via intervening adhesive material. Laminated panes afford advantages from the safety point of view, especially when used as vehicle windscreens. Also, it is in general easier to form one coating (low-emissivity or solar radiation screening) on each of two sheets than it is to form both coatings on the same sheet. A further advantage of the use of a laminate is that it enables the solar radiation screening coating to be located within the thickness of the laminate where it will be protected against abrasion in use.

The said solar radiation screening coating could be constituted as an energy absorbing coating, but the use of such coatings tends to increase the temperature of the panel under given incident radiation conditions thus leading to an increased reradiation of infra red energy by the panel, and such coatings also tend to be inherently absorptive of visible light. It is therefore preferable that said solar radiation screening coating is a reflective coating deposited on the other exposed face of the pane. Such a coating can have a greater visible light transmissivity, and its solar screening effect does not entail so much heating of the coated pane. Such a coating may also be useful in masking any unsightly interference coloration effects which may be present due to the low emissivity coating.

Advantageously, said reflective coating comprises titanium dioxide. Coatings containing titanium dioxide can form highly efficient energy reflecting screens. Such a coating may for example comprise a mixture of tin and titanium dioxides.

Preferably, said reflective coating has a thickness in the range 20nm to 350nm. The actual thickness to be selected will depend on the desired properties of the coating, bearing in mind the desirability of satisfactory visible light transmissivity coupled with efficient energy screening and suitable abrasion resistance. A mixed tin and titanium dioxide coating can be particularly beneficial in this respect, since firstly, such a coating has an inherently greater abrasion resistance than a coating of pure titanium dioxide, and secondly, it has a lower refractive index than a coating of pure titanium dioxide so that for the same solar energy transmission properties it can be made thicker and thus more abrasion resistant.

Windows for installation in vehicles of various sorts are often curved, and the present invention accordingly includes a pane as hereinbefore defined which is curved so as to have one convex main face and one concave main face.

We have already stated that the effectiveness of the pane will in some measure depend upon the side thereof on which energy is incident, and that for the best results, the low emissivity coating should be inboard of the solar screening coating, so that of those two coatings, the solar screening coating is first to intercept solar radiation. Since such curved panes are most usually installed with their concave faces facing inwardly when used as vehicle windows, it is preferred that the low emissivity coating is located on the concave main face of the pane.

The invention also includes a pane as hereinbefore defined which is mounted in a vehicle with its low emissivity coating directed towards the interior of the vehicle.

The invention further extends to a motor vehicle equipped with at least one window formed by a pane as hereinbefore defined.

BRIEF DESCRIPTION OF THE DRAWING

Various preferred embodiments of the invention will now be described in greater detail with reference to the accompanying diagrammatic drawing which shows a pane according to the invention mounted as a road vehicle windscreen, and by way of Example.

DESCRIPTION OF THE PREFERRED EMBODIMENTS

In the drawing, a vehicle window generally indicated at 100 comprises a sheet 101 of glass which bears a coating 102 which reduces the emissivity of the coated face in respect of infra-red radiation having wavelengths in excess of 3 μm. The uncoated face of the glass sheet 101 is bonded via an adhesive layer (not shown) to a second sheet 103. That second sheet 103 bears on its exposed face a second coating 104. That second coating 104 is adapted to screen short wavelength infrared radiation. The thickness of each coating 102, 104 is selected so that the pane has a visible light transmissivity of at least 70% and a total solar radiant energy transmissivity of at most 75%.

The pane 100 is curved so that it has one convex face and one concave face. The low emissivity coating 102 is on the concave face. The pane is mounted as a road vehicle windscreen in a recess 105 of a vehicle body 106 and is bonded to the vehicle body by adhesive 107 with the low emissivity coating 102 facing the inside of the vehicle.

In a variant, the pane 100 comprises a single sheet of glass which is coated on each of its faces.

In another variant, the or each sheet of glass used is chemically tempered. Alternatively, the glass may be thermally tempered.

EXAMPLES

In the Examples various coatings are applied pyrolytically to the two faces of soda-lime sheet glass which is 4mm in thickness. The coatings are as follows.

Low Emissivity Coating A. Sheets of glass 4mm in thickness are pyrolytically coated with a fluorine-doped tin dioxide coating having a thickness of 330nm, and an emissivity of 0.25 in respect of infra-red radiation having wavelengths in excess of 3 μm.

Low Emissivity Coating B. Sheets of glass 4mm in thickness are pyrolytically coated with a fluorine-doped tin dioxide coating having a thickness of 260nm, and an emissivity of 0.30 in respect of infra-red radiation having wavelengths in excess of 3 μm.

Low Emissivity Coating C. Sheets of glass 4mm in thickness are pyrolytically coated with a fluorine-doped tin dioxide coating having a thickness of 200nm, and an emissivity of 0.50 in respect of infra-red radiation having wavelengths in excess of 3 μm.

Solar Radiation Screening Coating A. Sheets of glass bearing a low emissivity coating as exemplified above are pyrolytically coated to a thickness of 20nm, the coating being composed substantially entirely of titanium dioxide.

Solar Radiation Screening Coating B. Sheets of glass bearing a low emissivity coating as exemplified above are pyrolytically coated to a thickness of 20nm, the coating being composed of titanium dioxide 70% by volume, and tin dioxide 30% by volume.

Solar Radiation Screening Coating C. Sheets of glass bearing a low emissivity coating as exemplified above are pyrolytically coated to a thickness of 20nm, the coating being composed of titanium dioxide 30% by volume, and tin dioxide 70% by volume.

Solar Radiation Screening Coating D. Sheets of glass bearing a low emissivity coating as exemplified above are pyrolytically coated to a thickness of 320nm, the coating being composed substantially entirely of titanium dioxide.

Solar Radiation Screening Coating E. Sheets of glass bearing a low emissivity coating as exemplified above are pyrolytically coated to a thickness of 320nm, the coating being composed of titanium dioxide 70% by volume, and tin dioxide 30% by volume.

Solar Radiation Screening Coating F. Sheets of glass bearing a low emissivity coating as exemplified above are pyrolytically coated to a thickness of 160nm, the coating being composed of titanium dioxide 30% by volume, and tin dioxide 70% by volume.

Solar Radiation Screening Coating G. Sheets of glass bearing a low emissivity coating as exemplified above are pyrolytically coated to a thickness of 320nm, the coating being composed of titanium dioxide 30% by volume, and tin dioxide 70% by volume.

The various coated sheets were then illuminated using C.I.E. Illuminant D, incident on the face bearing the solar radiation screening coating, and various properties of the coated sheets were measured as follows.

| EX. | LOW EMISSIVITY COATING | SOLAR SCREENING COATING | VISIBLE LIGHT TRANSMISSIVITY | TOTAL ENERGY TRANSMISSIVITY | VISIBLE LIGHT ABSORBENCY | COLOUR PURITY |
| --- | --- | --- | --- | --- | --- | --- |
| 1 | A | A | 73.2% | 70.3% | 2.5% | 5.5% |
| 2 | B | A | 74.7% | 70.6% | 2.5% | 4.5% |
| 3 | C | A | 71.0% | 71.4% | 2.6% | 5.3% |
| 4 | A | B | 76.5% | 72.6% | 2.6% | 4.0% |
| 5 | B | B | 78.2% | 72.8% | 2.6% | 3.0% |
| 6 | C | B | 74.1% | 73.6% | 2.7% | 3.7% |
| 7 | A | C | 79.1% | 73.3% | 2.7% | 2.9% |
| 8 | B | C | 81.0% | 74.5% | 2.7% | 1.9% |
| 9 | B | D | 72.2% | 66.0% | 2.8% | 5.0% |
| 10 | B | E | 71.0% | 68.0% | 2.8% | 4.7% |
| 11 | A | F | 76.3% | 70.1% | 2.9% | 9.4% |
| 12 | B | F | 77.5% | 70.0% | 2.8% | 8.0% |
| 13 | A | G | 72.6% | 69.3% | 3.0% | 6.4% |
| 14 | B | G | 73.8% | 69.3% | 3.0% | 1.5% |

The values for colour purity were obtained using C.I.E. Illuminant C.

We claim:

1. A light transmitting glazing pane, comprising: at least one sheet of coated glass; a first coating on a glass face which is exposed, which first coating is comprised of tin oxide, has a thickness which does not exceed 350nm, and reduces the emissivity of that glass face in respect of infra-red radiation having wavelengths in excess of 3 μm; and a second coating which is reflective, which is comprised of titanium dioxide, which is a solar radiation screening coating for screening short wavelength infra-red radiation, and which is deposited on another face of the pane, which another face is exposed to the environment, wherein the thickness of each coating is selected so that the pane has a visible light transmissivity of at least 70% and a total solar radiant energy transmissivity of at most 75%.

2. The pane according to claim 1, wherein the first coating has a thickness ranging from 150nm to 350nm.

3. The pane according to claim 1, wherein the pane has a color purity of not more than 10%.

4. The pane according to claim 3, wherein the pane has a color purity of not more than 6%.

5. The pane according to claim 1, wherein the first coating imparts to the glass face an emissivity factor in respect of infra-red radiation having wavelengths in excess of 3 μm of at most 0.50.

6. The pane according to claim 1, wherein the first coating has an emissivity factor and a thickness expressed in nanometers which are such that their product is not more than 110.

7. The pane according to claim 6, wherein the product is not more than 90.

8. The pane according to claim 1, wherein the pane is a laminate in which a glass sheet is bonded to at least one other sheet via intervening adhesive material.

9. The pane according to claim 1, wherein the pane is curved so as to have one convex main face and one concave main face.

10. The pane according to claim 9, wherein the first coating is located on the concave main face of the pane.

11. The pane according to claim 1, wherein the first coating is a fluorine-doped tin oxide coating.

12. The pane according to claim 1, wherein said reflective coating has a thickness ranging from 20nm to 350nm.

13. A light transmitting glazing pane, comprising: at least one sheet of coated glass; a first coating on a glass face which is exposed, which first coating is comprised of tin oxide, has a thickness ranging from 150 to 350nm, and reduces the emissivity of that glass face in respect of infra-red radiation having wavelengths in excess of 3 μm; and a second coating which is comprised of titanium dioxide and has a thickness ranging from 20 to 350nm, which is a solar radiation screening coating for screening short wavelength infra-red radiation, and which is deposited on another face of the pane, which another face is exposed to the environment.

wherein the thickness of each coating is selected so that the pane has a visible light transmissivity of at least 70% and a total solar radiant energy transmissivity of at most 75%.

14. The pane according to claim 13, wherein the pane has a visible light transmissivity of at least 75%.

15. The pane according to claim 13, wherein the pane has a color purity of not more than 10%.

16. The pane according to claim 15, wherein the pane has a color purity of not more than 6%.

17. The pane according to claim 13, wherein the first coating imparts to the glass face an emissivity factor in respect of infra-red radiation having wavelengths in excess of 3 μm of at most 0.50.

18. The pane according to claim 13, wherein the first coating has an emissivity factor and a thickness expressed in nanometers which are such that their product is not more than 110.

19. The pane according to claim 18, wherein the product is not more than 90.

20. The pane according to claim 13, wherein the first coating is a fluorine-doped tin oxide coating.

21. The process of providing a vehicle with a light transmitting glazing pane, comprising:
   mounting in a vehicle a light transmitting glazing pane comprising:
   at least one sheet of coated glass;
   a first coating on a glass face which is exposed in use to an indoor environment, which first coating is comprised of tin oxide, has a thickness which does not exceed 350nm, and reduces the emissivity of that glass face in respect of infra-red radiation having wavelengths in excess of 3 μm; and
   a second coating which is reflective, which is comprised of titanium dioxide, which is a solar radiation screening coating for screening short wavelength infra-red radiation, and which is deposited on another face of the pane, which another face is exposed in use to an outdoor environment,
   wherein the thickness of each coating is selected so that the pane has a visible light transmissivity of at least 70% and a total solar radiant energy transmissivity of at most 75%,
   wherein the pane has a visible light absorbency of not more than 3%, and
   wherein the light transmitting glazing pane is mounted in the vehicle with the first coating directed towards the interior of the vehicle.

22. A motor vehicle equipped with at least one window formed by a light transmitting glazing pane comprising:
   at least one sheet of coated glass;
   a first coating on a glass face which is exposed in use to an indoor environment, which first coating is comprised of tin oxide, has a thickness which does not exceed 350nm, and reduces the emissivity of that glass face in respect of infra-red radiation having wavelengths in excess of 3 μm; and
   a second coating which is reflective, which is comprised of titanium dioxide, which is a solar radiation screening coating for screening short wavelength infra-red radiation, and which is deposited on another face of the pane, which another face is exposed in use to an outdoor environment,
   wherein the thickness of each coating is selected so that the pane has a visible light transmissivity of at least 70% and a total solar radiant energy transmissivity of at most 75%, and
   wherein the pane has a visible light absorbency of not more than 3%.

23. The pane according to claim 1, wherein the pane has a visible light transmissivity of at least 75%.

* * * * *